United States Patent
Recksiek et al.

(10) Patent No.: US 7,872,367 B2
(45) Date of Patent: Jan. 18, 2011

(54) METHOD AND DEVICE FOR REDUNDANTLY SUPPLYING SEVERAL ELECTRIC SERVOMOTORS OR DRIVE MOTORS BY MEANS OF A COMMON POWER ELECTRONICS UNIT

(75) Inventors: Martin Recksiek, Hamburg (DE); Christoph Giebeler, Bremen (DE)

(73) Assignees: Airbus Deutschland GmbH (DE); Deutsches Zentrum für Luft- und Raumfahrt e.V. (DLR) (DE)

( * ) Notice: Subject to any disclaimer, the term of this patent is extended or adjusted under 35 U.S.C. 154(b) by 264 days.

(21) Appl. No.: 12/086,959

(22) PCT Filed: Dec. 12, 2006

(86) PCT No.: PCT/EP2006/011955
§ 371 (c)(1), (2), (4) Date: Jun. 13, 2008

(87) PCT Pub. No.: WO2007/068451
PCT Pub. Date: Jun. 21, 2007

(65) Prior Publication Data
US 2009/0045678 A1    Feb. 19, 2009

(30) Foreign Application Priority Data
Dec. 13, 2005  (DE) .................... 10 2005 059 423

(51) Int. Cl.
*B60L 1/00*    (2006.01)
*H02J 3/38*    (2006.01)

(52) U.S. Cl. ........................... 307/9.1; 307/19
(58) Field of Classification Search .............. 307/19, 307/9.1
See application file for complete search history.

(56) References Cited

U.S. PATENT DOCUMENTS

| | | | | |
|---|---|---|---|---|
| 4,754,940 A * | 7/1988 | Deter | ........................ | 244/75.1 |
| 6,860,452 B2 | 3/2005 | Bacon et al. | | |
| 6,936,982 B2 | 8/2005 | Diesner et al. | | |
| 7,038,405 B2 * | 5/2006 | Makinen et al. | ............... | 318/78 |
| 7,098,555 B2 * | 8/2006 | Glahn et al. | .................. | 307/32 |
| 7,401,869 B2 * | 7/2008 | Mallevais et al. | ........... | 303/126 |
| 7,439,634 B2 * | 10/2008 | Michalko | ..................... | 307/43 |

FOREIGN PATENT DOCUMENTS

| | | |
|---|---|---|
| DE | 196 10 800 C1 | 7/1997 |
| DE | 102 51 763 B3 | 8/2004 |
| DK | 271 004 A1 | 8/1989 |
| EP | 1310848 | 5/2003 |

OTHER PUBLICATIONS

International Search Report, PCT/EP2006/011955.

* cited by examiner

*Primary Examiner*—Michael Rutland Wallis
(74) *Attorney, Agent, or Firm*—Lerner, David, Littenberg, Krumholz & Mentlik, LLP

(57) ABSTRACT

A method and a device for redundantly supplying several electric servomotors or drive motors by a common power electronics unit, particularly in an aircraft, wherein the power electronics unit contains a number of electronic motor control units, and wherein the electric motors are operated with nominal power if the electronic motor control units are fully functional. The motors are operated with the available residual power of the motor control units if partial failure of the motor control units occurs. The motors may be operated sequentially or simultaneously.

24 Claims, 6 Drawing Sheets

METHOD AND DEVICE FOR REDUNDANTLY SUPPLYING SEVERAL ELECTRIC SERVOMOTORS OR DRIVE MOTORS BY MEANS OF A COMMON POWER ELECTRONICS UNIT

REFERENCE TO RELATED APPLICATIONS

This application claims the benefit of the filing date of the German patent application DE 10 2005 059 423.9 filed on Dec. 13, 2005, the disclosure of which is hereby incorporated by reference.

BACKGROUND OF THE INVENTION

The invention relates to a method and a device for redundantly supplying several electric servomotors or drive motors by a common power electronics unit, particularly in an aircraft. Until recently, the drive technology for modern commercial aircraft was dominated by hydraulic actuators, e.g., for landing flaps, landing gears, elevators, etc. Due to the rapid developments in the field of micro and power semiconductor technology over the last 20 years, particularly with respect to structural size, switching frequency, temperature resistance and electric strength, electric drives, i.e., electric servomotors and drive motors, have also become attractive for the aircraft industry. In addition to their low maintenance expenditures, electric drives are highly efficient and flexible. There is a demand for power electronics and motors that are adapted to one another in such a way that they optimally fulfill the special requirements of the aircraft industry with respect to weight, size and reliability.

One effective option for saving weight and space is the common utilization of a power electronics unit for different aircraft systems that contain servomotors or drive motors. To this end, the availability of the common unit used needs to be improved by increasing the redundancy while simultaneously achieving an overall weight reduction of the aircraft.

A higher redundancy becomes less attractive if it is realized by multiplying independent units that, however, are intolerant to individual defects. This simple option for increasing the redundancy does not have only disadvantageous effects on the weight and the required installation space, but is also associated with the disadvantage that, for example, 50% of the weight are normally carried along in an unused fashion in a dual redundancy system while 50% of the power is lost if an individual defect occurs. In addition, the failure probability rises due to the increase of overall components per function if the intolerance to such individual defects is not reduced.

SUMMARY OF THE INVENTION

It is an aim of the invention to provide an improved method and an improved device for redundantly supplying several electric servomotors or drive motors by a common power electronics unit.

On one hand, this aim is attained with a method with the characteristics of claim 1.

On the other hand, this aim is attained with a device with the characteristics of claim 14.

Advantageous additional developments and embodiments of the method and the device according to the present invention are disclosed in the respective dependent claims.

An exemplary embodiment of the invention provides a method for redundantly supplying several electric servomotors or drive motors by a common power electronics unit, particularly in an aircraft, wherein the power electronics unit contains a number of electronic motor control units, and wherein the electric motors are operated with nominal power if the electronic motor control units are fully functional. According to an exemplary embodiment of the invention, the motors are operated with the available residual power of the motor control units if partial failure of the motor control units occurs.

According to an exemplary embodiment of the inventive method, the motor control units respectively generate part of x phases, with which the motors are operated, wherein the motors are operated with the still intact phases of the motor control units if partial failure of the motor control units occurs.

According to an exemplary embodiment of the inventive method, the motor control units, particularly two motor control units, respectively generate half x/2 of the number x of the phases, with which the motors, particularly two motors, are operated.

According to another exemplary embodiment of the inventive method, the motor control units respectively generate the full number x of phases, with which the motors are operated, wherein the motors are operated with the reduced power of the still functional motor control units if partial failure of the motor control units occurs.

According to an exemplary embodiment of the inventive method, the motors are operated sequentially.

According to another exemplary embodiment of the inventive method, the motors are operated simultaneously.

According to an exemplary embodiment of the inventive method, the motors drive the landing flap drive and the main landing gear of an aircraft.

According to an exemplary embodiment of the inventive method, the motors sequentially drive the landing flap drive and the main landing gear of an aircraft, wherein the energy generated on one of the motors is used for actuating one of the other motors in case of an energy shortage.

According to another exemplary embodiment of the inventive method, the motors drive a duplex drive of a landing flap drive of an aircraft.

According to an exemplary embodiment of the invention the motors preferably belong to the same power class and have the same power output, particularly when they operate simultaneously.

According to an exemplary embodiment of the invention the motors spatially close to one another, particularly when they operate simultaneously.

According to an exemplary embodiment of the inventive method, all motors are operated with the power of the still functional motor control units if failure of part of the motor control units occurs.

According to another exemplary embodiment of the inventive method, all motors are operated with the still available residual power of the motor control units if partial failure of the motor control units occurs.

According to an exemplary embodiment of the invention there is provided a device for redundantly supplying several electric servomotors or drive motors by a common power electronics unit, particularly in an aircraft, wherein the power electronics unit contains a number of electronic motor control units and a switching device for selectively connecting the motor control units to the motors, and wherein the electric motors may be operated with nominal power if the electronic motor control units are fully functional. According to an exemplary embodiment of the invention, the motors may be operated with the available residual power of the motor control units by the switching device if partial failure of the motor control units occurs.

According to an exemplary embodiment of the inventive device, the motor control units are respectively provided for generating a part of x phases, with which the motors are operated, wherein the motors may be operated with the still intact phases of the motor control units by the switching device if partial failure of the motor control units occurs.

According to an exemplary embodiment of the inventive device, the motor control units, particularly two motor control units, respectively generate half x/2 of the number x of the phases, with which the motors, particularly two motors, may be operated.

According to another exemplary embodiment of the inventive device, the motor control units are respectively provided for generating the full number x of the phases, with which the motors may be operated, wherein the motors may be operated with the reduced power of the still functional motor control units by the switching device if partial failure of the motor control units occurs.

According to an exemplary embodiment of the inventive device, the motors may be operated sequentially by the switching device.

According to another exemplary embodiment of the inventive device, the motors may be operated simultaneously by the switching device.

According to an exemplary embodiment of the inventive device, the motors drive the landing flap drive and the main landing-gear of an aircraft.

According to an exemplary embodiment of the inventive device, the motors sequentially drive the landing flap drive and the main landing gear of an aircraft, wherein the energy generated by one of the motors is used for actuating one of the other motors in case of an energy shortage.

According to an exemplary embodiment of the inventive device, the motors drive a duplex drive of a landing flap drive of an aircraft.

According to an exemplary embodiment of the invention the motors belong to the same power class and have the same power output, particularly when they operate simultaneously.

According to an exemplary embodiment of the invention the motors are arranged spatially close to one another, particularly when they operate simultaneously.

According to an exemplary embodiment of the inventive device, all motors may be operated with the power of the still functional motor control units by the switching device if failure of part of the motor control units occurs.

According to an exemplary embodiment of the inventive device, all motors may be operated with the still available residual power of the motor control units by the switching device if partial failure of the motor control units occurs.

In contrast to the conventional redundancy, the "integrated redundancy" in accordance with the present invention means that one unit or function is initially autonomized and then partitioned such that the tolerance referred to individual defects is increased and the decrease in power per individual defect may be simultaneously reduced.

Due to the significantly improved availability, the invention allows the sequential utilization by multiple consumer systems with similar power characteristic and cycle time, namely without decreasing the overall availability of the participating consumers. Such a solution merely requires an additional power connection as well as a switching function in order to switch over between the consumers.

According to an exemplary embodiment of the invention the electric motors, for example, act as an electromechanical energy converter of the respective aircraft system and belong to the same power class, wherein the electric motors are installed such that they are not spatially arranged excessively far from the commonly utilized power electronics. The reason for this cannot only be seen in the resulting weight of the lines, but primarily in parasitic line capacitances that have negative effects on the power electronics and the control. Such a common utilization can be realized in systems with timely non-concurrent operating intervals, i.e., in a sequential multiple utilization; however, it is also possible to realize a constellation with a synchronous utilization, i.e., a simultaneous utilization, wherein the latter variation is primarily sensible as a backup solution for identical adjacent systems.

The landing flap drive and the drive of the main landing gear represent examples of two ideal systems for the sequential utilization because they only need to be successively supplied with power for a comparatively short period of time, however, with very high reliability. In addition, the above-mentioned aircraft systems fulfill the criteria of "power affinity" as well as spatial vicinity. With respect to the sequential utilization of the power electronics, the synergy potential of the electrically actuated landing flap system and landing gear are particularly interesting because the active and passive phases of both systems may be used for regenerative purposes.

After takeoff, the retraction of the landing flaps with the assistance of the air acting thereupon may be used for generating energy for raising the landing gear in case of a supply shortage or the failure of the power supply systems. The circumstances are similar during is so-called go-around maneuver. During landing, in contrast, energy is required in order to extend the landing flaps, wherein this energy could be generated when the landing gear is lowered. The demand for an increased reliability or redundancy, respectively, of this integrated unit over separate decentralized units results from the desired combination and integration of several power electronics into one unit. However, the point is not simply accommodating several conventional units in a common housing, but rather a weight reduction and a simultaneous increase in the redundancy of the power electronics.

Embodiments of the invention are described below with reference to the figures.

DETAILED DESCRIPTION OF THE EMBODIMENTS

Figure 1:
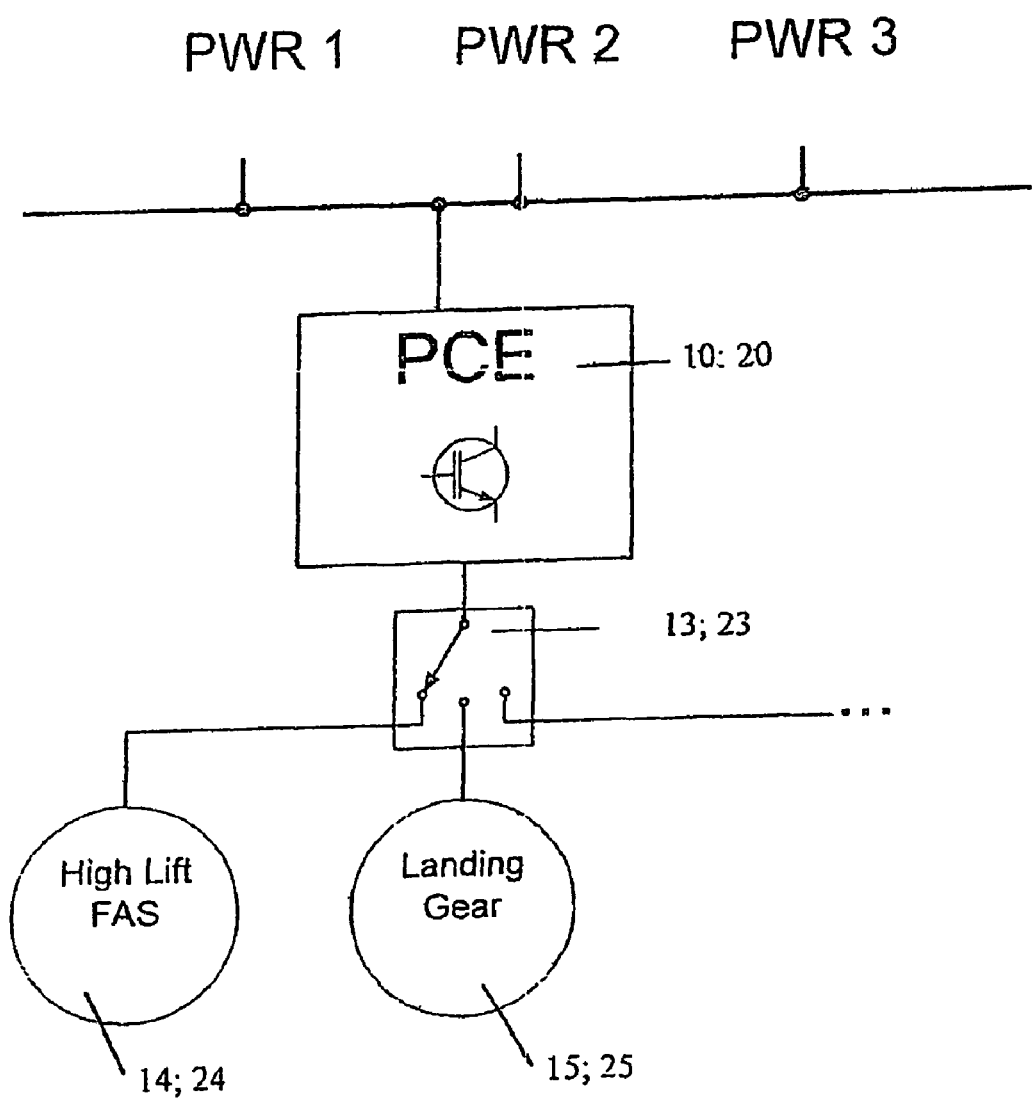
FIG. 1, a highly simplified diagram of the sequential utilization of common power electronics by different aircraft systems that respectively contain servomotors or drive motors supplied by the common power electronics.

FIG. 1 shows a highly simplified diagram of a sequential utilization, i.e., a successive or alternate utilization, of common power electronics 10; 20 (PCE, Power Control Electronics) by different aircraft systems, namely a high lift system (High Lift FAS) and a landing gear (Landing Gear) that respectively contain servomotors or drive motors 14, 24 and 15; 25 that are supplied by the common power electronics 10; 20 and selectively connected, i.e., in accordance with the respective requirements, to the power electronics 10; 20 by a switching device 13; 23 in order to be supplied with energy. The power supply of the power electronics 10; 20 is realized with various redundant power supplies PWR (Power) 1 to 3 as schematically indicated in FIG. 1.

Figures 2A, 2B:
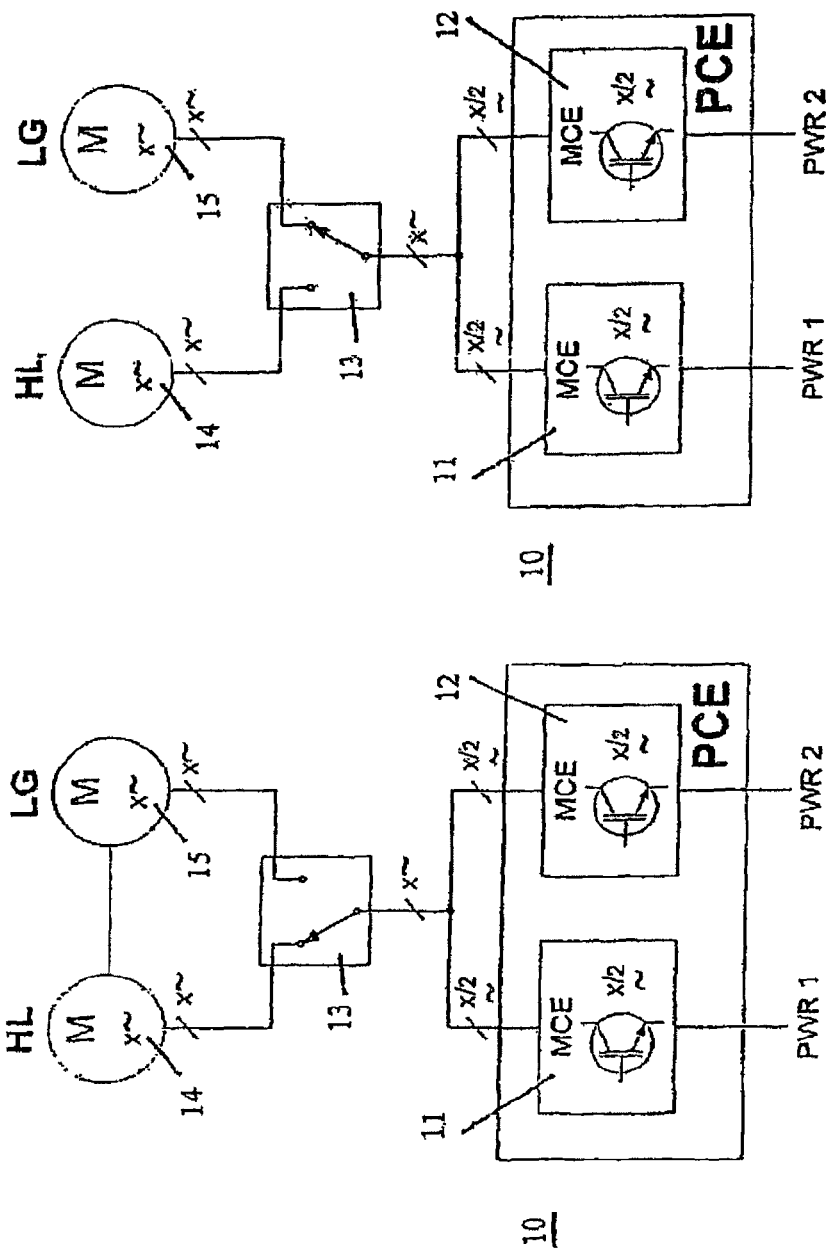
FIGS. 2a) and b), a circuit diagram of a system according to one embodiment of the invention, in which common power electronics are sequentially utilized, for example, by the landing flap system and the landing gear in the fully functional normal operating mode.

FIGS. 2a) and b) respectively show a circuit diagram of a system according to one embodiment of the invention, in which common power electronics 10 abbreviated in the form of PCE (Power Control Electronics) are utilized sequentially, for example, by the landing flap system and the landing gear, namely in the fully functional normal operating mode.

The device for redundantly supplying several electric servomotors or drive motors 14, 15, in this case two motors, by a common power electronics unit (PCE) 10 contains a number of electronic motor control units 11, 12 abbreviated in the form of MCE (Motor Control Electronics), in this case two motor control units, and a switching device 13 for selectively connecting the motor control units 11, 12 to the motors 14, 15 in order to supply these motors with energy; see the motor 14 in FIG. 2a) and the motor 15 in FIG. 2b). When the electronic motor control units 11, 12 are fully functional, the electric motors 11, 12 are respectively operated with nominal power.

The two motor control units 11, 12 are respectively provided for generating a part of x phases, namely half x/2 of x phases, with which the motors are operated, wherein the two motors 14, 15 are operated with the still intact phases of the motor control units 11, 12 by the switching device 13 if partial failure of the motor control units 11, 12 occurs, i.e., both of the motors 14, 15 are operated with the still available residual power of the motor control units 11, 12 by the switching device 13 if partial failure of the motor control units 11, 12 occurs.

Consequently, the PCE 10 is "intrinsically redundant", i.e. the total number of phases x is divided over two separate and autonomous converters (MCEs), i.e., the motor control units 11, 12 that respectively generate half of the phases. This not only prevents total failure if an individual defect occurs, but simultaneously makes it possible to reduce the weight in comparison with a solution featuring two independent PCEs that respectively have the full number of phases.

Figure 3B:
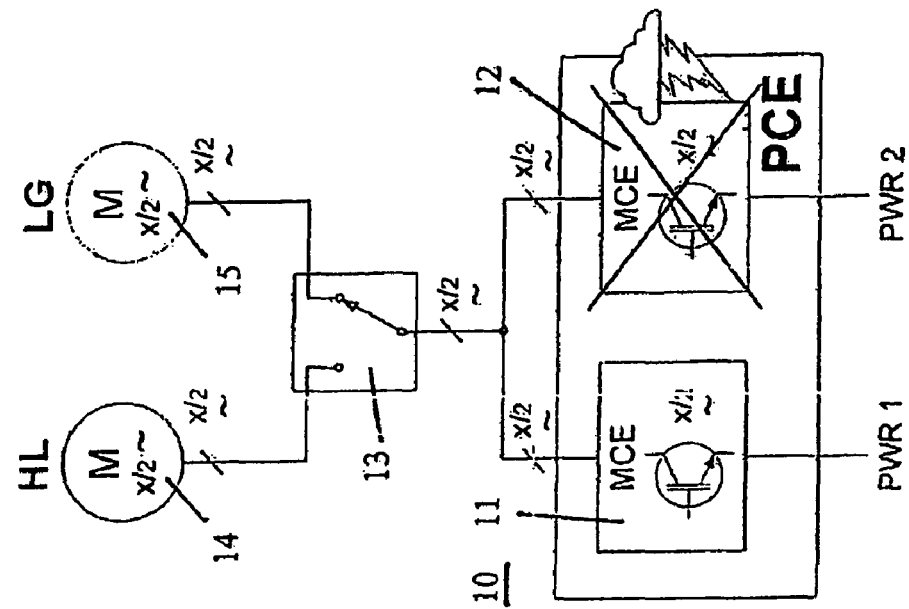
FIGS. 3a) and b), a circuit diagram of a system, in which common power electronics are sequentially utilized by the landing flap system and the landing gear in accordance with the embodiment of the invention shown in FIG. 2, namely during a defect in the power electronics.
Figure 3A:
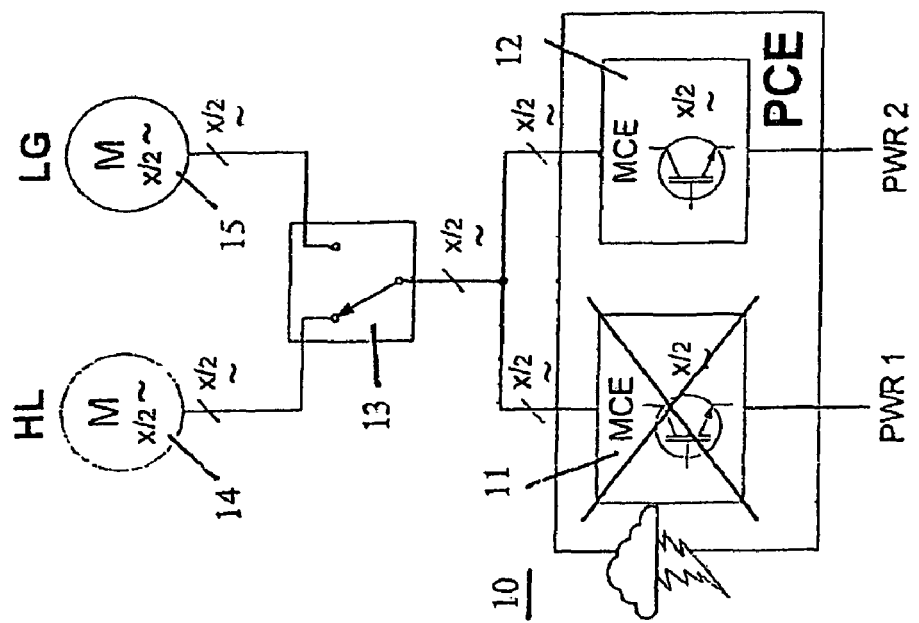
Figure 4:
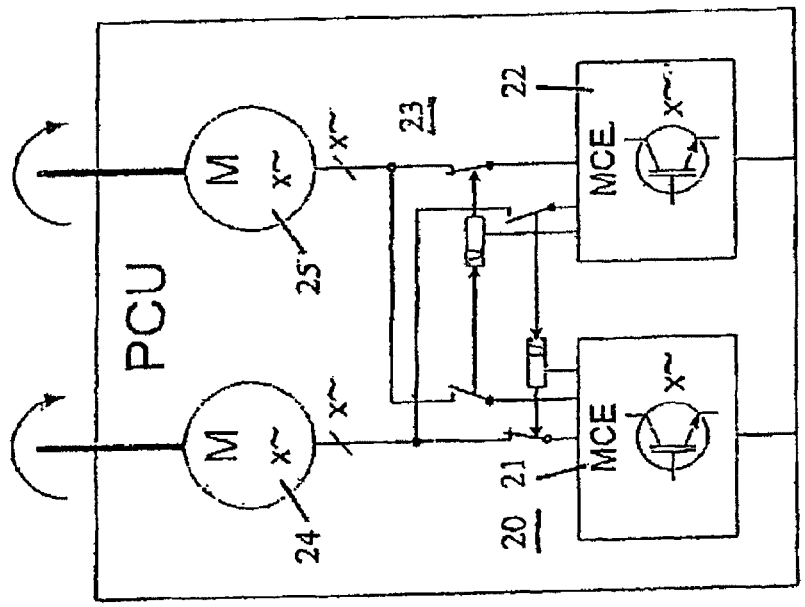
FIG. 4, a circuit diagram of a system according to one embodiment of the invention, in which two full-fledged motor control units in the form of a reconfigurable arrangement respectively control one of two motors simultaneously, e.g., in a duplex drive of a central landing flap drive, in the fully functional normal operating mode, and FIGS. 5 a) to e), respective circuit diagrams of a system according to the embodiment of the invention shown in FIG. 4, wherein two full-fledged motor control units are reconfigured due to various defects in order to be simultaneously utilized for the common supply of one or both motors contained in a duplex drive.

The embodiments in FIGS. 3a) and b) elucidate the effect of an individual defect in one of the two MCEs 11, 12. This results in the loss of half of the phase conductors in the PCE 10 and manifests itself in a degraded power deployment in the consumer systems—respectively indicated with x/2 in the respective figures—but does not lead to the total failure of one of the two systems. The term "intrinsic redundancy" was used in the example of a sequential utilization. The concept is not new per se, but in combination with a parallel utilization by several aircraft systems opens up new system design options with respect to weight and reliability. In this context, it would be conceivable to realize the following enhancements. If the number of phases per motor control unit (MCE) is doubled in the above-described example, i.e., if each MCE already represents a full-phase supply module for a motor, and the switch is modified in such a way that the phases of the modular motor controls (MCEs) may be collectively or separately switched through to one respective motor, it is also possible for two motors to simultaneously utilize a MCE module. In combination with the above-described configuration for a sequential utilization, this results in entirely new configuration options. This train of thought forms the transition to the next embodiment, in which the simultaneous utilization of power electronics is discussed in greater detail. The above-mentioned conventional central drive system of the landing flaps that is abbreviated in the form of PCU (Power Control Unit) and features duplex electric motors situated in the fuselage is used as the example for the simultaneous utilization of power electronics and described below with reference to FIGS. 4 and 5a) to e). In this constellation, each of the two motors 24, 25 is excited by a separate converter, i.e., a separate motor control unit 21, 22 (Motor Control Electronics-MCE) in the normal operating mode, wherein this corresponds, in principle, to the supply of the conventional fully hydraulic Power Control Unit (PCU) by two independent hydraulic systems. A switching device 23 is provided in order to selectively connect the MCEs 21, 22 to the motors 24, 25 in accordance with the respective requirements. If one of the two MCEs 21, 22 fails, the still intact MCE is able to continue operating both motors 24, 25 with reduced power—if the motor topology is chosen accordingly. If individual windings in one of the two motors are damaged instead or in addition to the MCE, it would be possible to selectively drive the intact phases only or to fully drive the completely intact motor only as long as the respective phase(es) of both of motors are known. In this particular embodiment, this concept of a simultaneous utilization is intended as a "backup" only in case a defect of the described type occurs.

As initially mentioned, the internal design of the Power Control Unit (PCU) was intentionally realized with two full-phase MCEs 21, 22. It should be noted that the examples of a sequential utilization that were described with reference to FIGS. 2a) and b) as well as 3a) and b) featured Power Control Electronics (PCE) 10 that consisted of several—in the described example two—complimentary units 11, 12 that respectively supply only part of the phase conductors while the embodiment with simultaneous utilization described below with reference to FIGS. 4 and 5a) to e) features two complete and independent units 21, 22 that supply all phases.

It is quite obvious that the design of the PCE 10 according to the first embodiment of a sequential utilization may be transferred to the MCEs 21, 22 according to the second embodiment such that the defect tolerance and therefore the operative states could be once again significantly increased despite multiple defects. A graphic representation of all possible combinations therefore was intentionally omitted. Different failure states of the arrangement shown in FIG. 4 as well as the handling thereof are described below with reference to FIGS. 5a) to 5e).

Figure 5A:
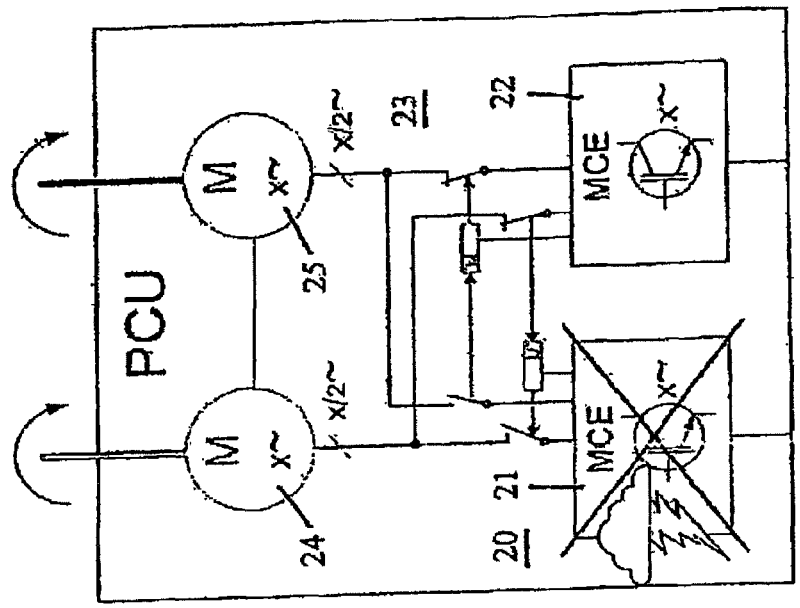

FIG. 5a): simultaneous utilization of the power electronics 20 during a total failure of the MCE 21. Both motors 24, 25 are supplied by the intact MCE 22. This means to cut in half the active phases per motor and the degradation of the power output.

Figure 5B:
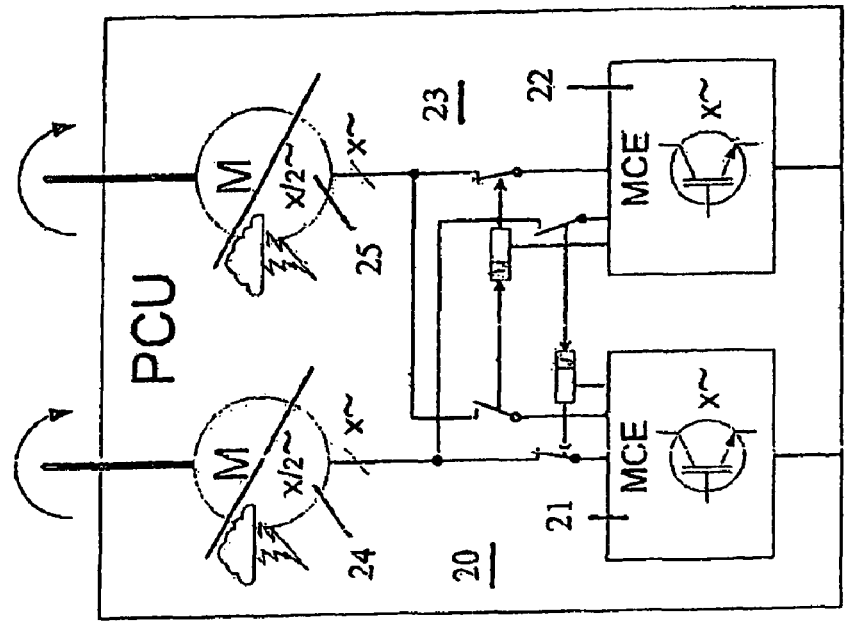

FIG. 5b): partial failure of both MCEs 21, 22. This leads to the same result as in FIG. 5a), but the supply is realized with the degraded MCEs 21, 22.

Figure 5C:
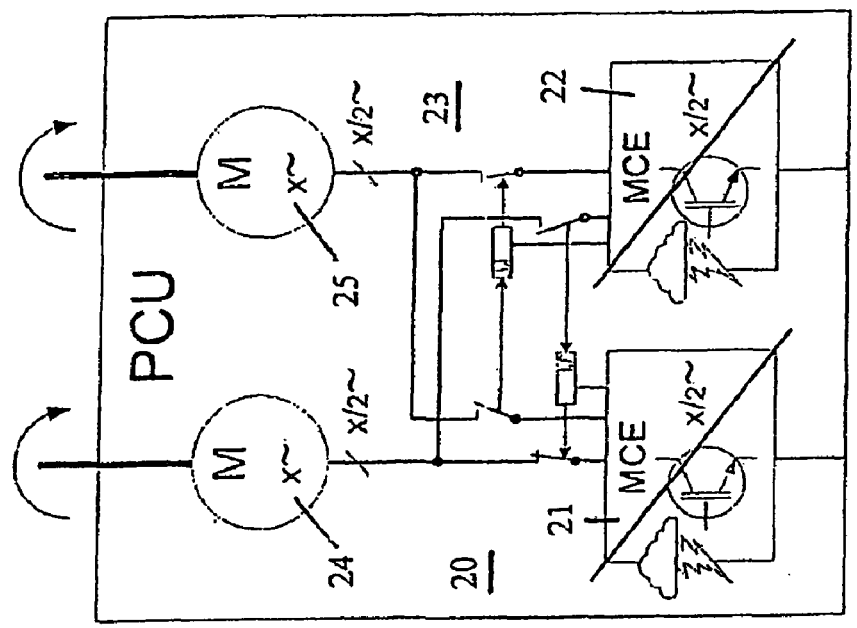

FIG. 5c): partial failure of both motors 24, 25. Both MCEs are intact. The result is identical to that described above.

Figure 5E:
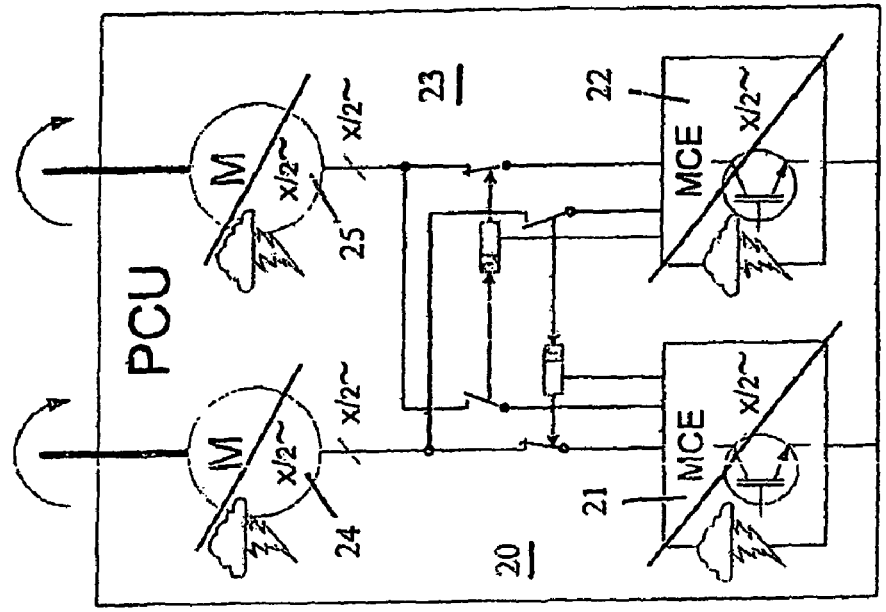
Figure 5D:
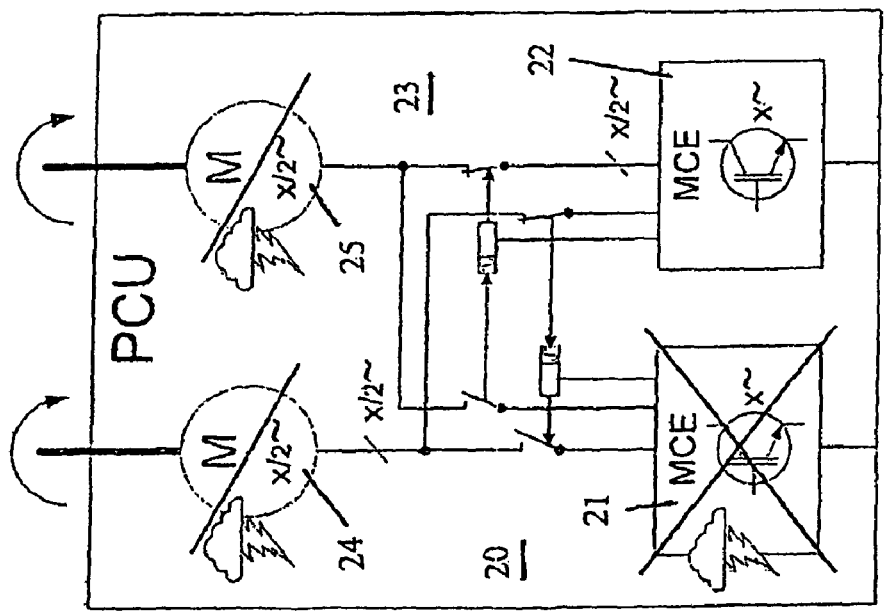

FIG. 5d): total failure of the MCE 21 and partial failure of both motors 24, 25. The MCE 22 supplies both motors 24, 25 with half the respective number of phases. The result is identical to that of FIG. 5a) and b), respectively.

FIG. 5e): partial failure of both MCEs 21, 22 and both motors 24, 25. The motors 24, 25 are still supplied by the respective MCE 21 or 22 analogous to the normal operating mode. Only the power is degraded. The result is identical to that described above.

In the scenarios with motor failure described with reference to FIGS. 5c) to e), it was always assumed that partial failure of both motors 24, 25 occurred although this is highly unlikely. However, a defect in only one motor would lead to the same result because the defect would be detected and both motors would be reduced to the power consumption of the defective motor. The defective phase of the corresponding motor could be determined with measurements carried out during its operation.

In summation, the described overall concept obviously results from the consequent implementation of the sequential utilization of a source by systems with short load cycle times. The resulting requirement for improved availability requires an increased redundancy. This increased redundancy should not be associated with the conventional increase in weight and structural space in order to not endanger the competitiveness of a system solution. The integrated redundancy that is based on autonomizing and partitioning the original function not only fulfills the restrictive requirements with respect to the structural space and the weight, but also makes it possible to realize additional system configurations for various defect scenarios that increase the flexibility and overall availability of the system.

It should be noted that the term 'comprising' does not exclude other elements or steps and the 'a' or 'an' does exclude a plurality. Also elements described in association with different embodiments may be combined.

It should be noted that the reference signs in the claims shall not be construed as limiting the scope of the claims.

LIST OF REFERENCE SYMBOLS

10; 20 Power electronics unit (PCE)
11; 21 Motor control unit (MCE)
12; 22 Motor control unit (MCE)
13; 23 Switching device
14; 24 Motor
15; 25 Motor

The invention claimed is:

1. A method for redundantly supplying a plurality of electric servomotors or drive motors by a common power electronics unit containing a plurality of electronic motor control units, comprising:
   operating the electric motors with nominal power when the electronic motor control units are fully functional, and operating the motors with the available residual power of the motor control units when partial failure of the motor control units occurs,
   wherein the motor control units generate part of a total number x of phases, with which the motors are operated, and wherein the motors are operated with the still intact phases of the motor control units if partial failure of the motor control units occurs.

2. The method of claim 1, wherein two motor control units respectively generate half x/2 of the number x of phases, with which the two motors are operated.

3. The method of claim 1, wherein the motor control units generate the full number x of phases, with which the motors are operated, and wherein the motors are operated with the reduced power of the still functional motor control units if partial failure of the motor control units occurs.

4. The method of claim 1, wherein the motors are operated sequentially.

5. The method of claim 1, wherein the motors are operated simultaneously.

6. The method of claim 1, wherein the motors drive the landing flap drive and the main landing gear of an aircraft.

7. The method of claim 6, wherein the motors sequentially drive the landing flap drive and the main landing gear of an aircraft, and wherein the energy generated on one of the motors is used for actuating one of the other motors in case of an energy shortage.

8. The method of claim 1, wherein the motors drive a duplex drive of a landing flap drive of an aircraft.

9. The method of claim 1, wherein the motors belong to the same power class and have the same power output when they operate simultaneously.

10. The method of claim 1, wherein the motors are spatially arranged close to one another when they operate simultaneously.

11. The method of claim 1, wherein the motors are operated with the power of the still functional motor control units if part of the motor control units fails.

12. The method of claim 1, wherein the motors are operated with the still available residual power of the motor control units if partial failure of the motor control units occurs.

13. A device for redundantly supplying a plurality of electric servomotors or drive motors comprising:
   a common power electronics unit containing a plurality of electronic motor control units and a switching device for selectively connecting the motor control units to the motors, and wherein the electric motors are operated with nominal power if the electronic motor control units are fully functional, and wherein the motors may be operated with the available residual power of the motor control units by the switching device if partial failure of the motor control units occurs,
   wherein the motor control units are provided for generating part of a total number x of phases, with which the motors are operated, and wherein the motors may be operated with the still intact phases of the motor control units by the switching device if partial failure of the motor control units occurs.

14. The device of claim 13, wherein two motor control units are respectively provided for generating half x/2 of the number x of phases, with which the two motors may be operated.

15. The device of claim 13, wherein the motor control units are provided for generating the full number x of phases, with which the motors may be operated, and wherein the motors may be operated with the reduced power of the still functional motor control units by the switching device if partial failure of the motor control units occurs.

16. The device of claim 13, wherein the motors may be operated sequentially by the switching device.

17. The device of claim 13, wherein the motors may be operated simultaneously by the switching device.

18. The device of claim 13, wherein the motors drive the land flap drive and the main landing gear of an aircraft.

19. The device of claim 18, wherein the motors sequentially drive the landing flap drive and the main landing gear of an aircraft, and wherein the energy generated on one of the motors is used for actuating one of the other motors in case of an energy shortage.

20. The device of claim 13, wherein the motors drive a duplex drive of a landing flap drive of an aircraft.

21. The device of claim 13, wherein the motors belong to the same power class and have the same power output when they operate simultaneously.

22. The device of claim 13, wherein the motors are spatially arranged close to one another when they operate simultaneously.

23. The device of claim 13, wherein the motors may be operated with the power of the still functional motor control units by the switching device if part of the motor control units fails.

24. The device of claim 13, wherein the motors may be operated with the still available residual power of the motor control units by the switching device if partial failure of the motor control units occurs.

* * * * *